(12) United States Patent
Matsumura

(10) Patent No.: US 11,186,755 B2
(45) Date of Patent: Nov. 30, 2021

(54) REACTIVE HOT-MELT ADHESIVE

(71) Applicant: The Yokohama Rubber Co., LTD., Tokyo (JP)

(72) Inventor: Misaki Matsumura, Hiratsuka (JP)

(73) Assignee: The Yokohama Rubber Co., LTD.

( * ) Notice: Subject to any disclaimer, the term of this patent is extended or adjusted under 35 U.S.C. 154(b) by 224 days.

(21) Appl. No.: 16/608,711

(22) PCT Filed: Apr. 18, 2018

(86) PCT No.: PCT/JP2018/015964
§ 371 (c)(1),
(2) Date: Oct. 25, 2019

(87) PCT Pub. No.: WO2018/198899
PCT Pub. Date: Nov. 1, 2018

(65) Prior Publication Data
US 2020/0048514 A1    Feb. 13, 2020

(30) Foreign Application Priority Data
Apr. 25, 2017 (JP) .............................. JP2017-085995

(51) Int. Cl.
*C09J 175/08* (2006.01)
*C09J 5/06* (2006.01)

(52) U.S. Cl.
CPC ................ *C09J 175/08* (2013.01); *C09J 5/06* (2013.01); *C09J 2433/00* (2013.01); *C09J 2475/00* (2013.01)

(58) Field of Classification Search
CPC ............ C08G 18/4808; C08G 18/4812; C08G 18/4829; C09J 175/06; C09J 175/08; C09J 5/06
See application file for complete search history.

(56) References Cited

U.S. PATENT DOCUMENTS

| 2007/0155859 A1* | 7/2007 | Song ..................... C08G 18/10 523/218 |
| 2010/0324254 A1 | 12/2010 | Saiki |
| 2015/0322314 A1* | 11/2015 | Franken ................ C08K 5/357 524/97 |
| 2016/0215185 A1* | 7/2016 | Li ....................... C08G 18/4018 |
| 2016/0355713 A1 | 12/2016 | Tsuno et al. |
| 2017/0158929 A1 | 6/2017 | Matsumura |
| 2017/0174960 A1 | 6/2017 | Matsumura |

FOREIGN PATENT DOCUMENTS

| JP | H03-172381 | 7/1991 |
| JP | 2011-001465 | 1/2011 |
| JP | 2015-163663 | 9/2015 |
| WO | WO 2015/016029 | 2/2015 |
| WO | WO 2015/129529 | 9/2015 |
| WO | WO 2016/002335 | 1/2016 |
| WO | WO 2016/002391 | 1/2016 |
| WO | WO 2016/157614 | 10/2016 |

OTHER PUBLICATIONS

International Search Report for International Application No. PCT/JP2018/015964 dated May 29, 2018, 4 pages, Japan.

* cited by examiner

*Primary Examiner* — Michael M Dollinger
(74) *Attorney, Agent, or Firm* — Thorpe North & Western

(57) ABSTRACT

The present technology provides a reactive hot-melt adhesive including a urethane prepolymer formed from a polyol and a polyisocyanate; and a thermoplastic poly (meth) acrylic resin; the polyol including a bifunctional polyol including polypropylene glycol and polyethylene glycol, a trifunctional polyol, and a polyester polyol having a glass transition temperature of from 20 to 60° C.

16 Claims, No Drawings

REACTIVE HOT-MELT ADHESIVE

TECHNICAL FIELD

The present technology relates to a reactive hot-melt adhesive.

BACKGROUND ART

Conventionally, reactive hot-melt adhesives have been used in the construction of buildings, automobiles, and the like to adhere members together.

Reactive hot-melt adhesives have reactivity and hot-melt properties (heat meltability). Reactive hot-melt adhesives can cure by itself and/or react or interact with a substrate owing to their reactivity.

Various reactive hot-melt adhesives have been proposed (e.g., Japan Unexamined Patent Publication No. 2015-163663 and International Patent Publication No. WO 2016/002391).

Under these circumstances, with reference to Japan Unexamined Patent Publication No. 2015-163663 or International Patent Publication No. WO 2016/002391, the present inventors prepared a reactive hot-melt adhesive including a urethane prepolymer which is produced without a polyester polyol or a trifunctional polyol. Furthermore, the reactive hot-melt adhesive described above was evaluated for its thermal adhesive strength (adhesive strength under high-temperature conditions) and durability (adhesion after a durability test to high temperature or water, assuming exposure to outside air for a long period).

These results indicated that the reactive hot-melt adhesive as described above may not satisfy desired levels of thermal adhesive strength and durability (Comparative Examples 1 to 3).

SUMMARY

The present technology provides a reactive hot-melt adhesive which has high thermal adhesive strength and excellent durability.

A desired effect can be achieved by a reactive hot-melt adhesive which includes a urethane prepolymer formed from a polyol and a polyisocyanate; and a thermoplastic poly (meth)acrylic resin, the polyol including a bifunctional polyol including polypropylene glycol and polyethylene glycol; a trifunctional polyol; and a polyester polyol having a glass transition temperature of from 20 to 60° C.

The present technology provides the following features.

1. A reactive hot-melt adhesive including a urethane prepolymer formed from a polyol and a polyisocyanate; and a thermoplastic poly (meth)acrylic resin, the polyol including a bifunctional polyol including polypropylene glycol and polyethylene glycol, a trifunctional polyol, and a polyester polyol having a glass transition temperature of from 20 to 60° C.

2. The reactive hot-melt adhesive according to 1, wherein the bifunctional polyol further includes polytetramethylene glycol.

3. The reactive hot-melt adhesive according to 1 or 2, wherein the glass transition temperature of the thermoplastic poly (meth)acrylic resin is from 40 to 80° C., and the weight average molecular weight of the thermoplastic poly (meth)acrylic resin is from 20 thousand to 100 thousand.

4. The reactive hot-melt adhesive according to any one of 1 to 3, which further includes a reaction catalyst.

5. The reactive hot-melt adhesive according to any one of 1 to 4, wherein the amount of the trifunctional polyol forming the urethane prepolymer is from 5 to 40 parts by mass per 100 parts by mass of the urethane prepolymer.

6. The reactive hot-melt adhesive according to any one of 1 to 5, wherein the content of the thermoplastic poly (meth)acrylic resin is from 5 to 30 parts by mass per 100 parts by mass of the urethane prepolymer.

The reactive hot-melt adhesive of an embodiment of the present technology has high thermal adhesive strength and excellent durability.

DETAILED DESCRIPTION

Embodiments of the present technology will be described in detail below.

Note that, in the present specification, (meth)acrylate represents acrylate or methacrylate, (meth)acryloyl represents acryloyl or methacryloyl, and (meth)acryl represents acryl or methacryl.

Furthermore, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

The components used in the present technology are not particularly limited as to their manufacturing methods. Examples thereof include known products.

In the present technology, the weight average molecular weights of the bifunctional polyol, trifunctional polyol, polyester polyol having a glass transition temperature of from 20 to 60° C., or thermoplastic poly (meth)acrylic resin are standard polystyrene equivalent values based on the measurements by gel permeation chromatography (GPC) using tetrahydrofuran (THF) as a solvent.

In the present technology, the glass transition temperature of the polyester polyol having a glass transition temperature of from 20 to 60° C. or the thermoplastic poly (meth)acrylic resin was measured in accordance with JIS (Japanese Industrial Standard) K7121-1987 "Transition temperature measurement method for plastic" (differential scanning calorimetry (DSC)).

Reactive Hot-Melt Adhesive

The reactive hot-melt adhesive of an embodiment of the present technology (the adhesive of an embodiment of the present technology) includes a urethane prepolymer formed from a polyol and a polyisocyanate; and a thermoplastic poly (meth)acrylic resin, the polyol including a bifunctional polyol including polypropylene glycol and polyethylene glycol; a trifunctional polyol; and a polyester polyol having a glass transition temperature of from 20 to 60° C.

The adhesive of an embodiment of the present technology achieves desired effects probably owing to its configuration. Although the reason is not clear, it is assumed to be as follows.

The tackiness (flexibility) is probably imparted to the adhesive of an embodiment of the present technology owing to the use of polyester polyol having a glass transition temperature within a predetermined range as a polyol forming the urethane prepolymer included in the embodiment of the present technology.

Furthermore, the use of a trifunctional polyol as a polyol forming the urethane prepolymer included in an embodiment of the present technology forms a three-dimensional crosslinked network in the cured adhesive of the embodiment of the present technology.

The adhesive of an embodiment of the present technology has high thermal adhesive strength and excellent durability (adhesion after exposure to conditions in which high temperature or water is present for a long period) probably because it has both the tackiness and crosslinked network.

The components included in the adhesive according to an embodiment of the present technology will be described in detail below.

Urethane Polymer

The adhesive of an embodiment of the present technology includes a urethane prepolymer formed from: a polyol including a bifunctional polyol including polypropylene glycol and polyethylene glycol, a trifunctional polyol, and a polyester polyol having a glass transition temperature of from 20 to 60° C.; and a polyisocyanate. The urethane prepolymer may have an isocyanate group at a terminal thereof.

In the present technology, the bifunctional polyol refers to a compound having two hydroxy groups per molecule.

The trifunctional polyol means a compound having three hydroxy groups per molecule.

The polyester polyol means a compound having a plurality of ester bonds and a plurality of hydroxy groups.

Bifunctional Polyol

The bifunctional polyol forming the urethane prepolymer includes at least polypropylene glycol and polyethylene glycol.

Polypropylene Glycol

The polypropylene glycol as a bifunctional polyol is not particularly limited. Examples of the polypropylene glycol include linear polymers having oxypropylene groups as repeating units and hydroxy groups at both ends. Weight Average Molecular Weight of Polypropylene Glycol The weight average molecular weight of the polypropylene glycol is preferably from 1000 to 50000 and more preferably from 2000 to 10000 from the perspective of achieving excellent workability (viscosity).

Polyethylene Glycol

The polyethylene glycol as a bifunctional polyol is not particularly limited. Examples of the polyethylene glycol include linear polymers having oxyethylene groups as repeating units and hydroxy groups at both ends. Weight Average Molecular Weight of Polyethylene Glycol The weight average molecular weight of the polyethylene glycol is preferably from 500 to 5000 and more preferably from 1000 to 3000 from the perspective of achieving excellent workability (viscosity).

Polytetramethylene Glycol

The bifunctional polyol preferably further includes polytetramethylene glycol from the perspective of achieving excellent workability and heat resistance.

The polytetramethylene glycol as a bifunctional polyol is not particularly limited. Examples of the polytetramethylene glycol include linear polymers having oxytetramethylene groups as repeating units and hydroxy groups at both ends.

Weight Average Molecular Weight of Poly(Tetramethylene Glycol)

From the perspective of achieving superior workability (viscosity), the weight average molecular weight of the polytetramethylene glycol is preferably from 500 to 5000 and more preferably from 1000 to 3000.

Trifunctional Polyol

In the present technology, the trifunctional polyol forming the urethane prepolymer is not particularly limited as long as the trifunctional polyol is a compound in which three hydroxy groups are bonded to an organic group. The organic group (skeleton of the trifunctional polyol) is not particularly limited. Examples of the organic group (skeleton of the trifunctional polyol) include polyoxyalkylene groups. The organic group may be branched.

Among them, polyoxyalkylene triol is preferred from the perspective of achieving higher durability and excellent adhesion.

Examples of the polyoxyalkylene triol include polyoxyethylene triol and polyoxypropylene triol.

Weight Average Molecular Weight of Trifunctional Polyol

The weight average molecular weight of the trifunctional polyol is preferably from 1000 to 10000 and more preferably from 2000 to 7000 from the perspective of achieving excellent workability (viscosity).

Polyester Polyol

The polyol forming the urethane prepolymer includes a polyester polyol having a glass transition temperature of from 20 to 60° C.

Since the glass transition temperature of the polyester polyol is within the range described above, the polyester polyol is amorphous.

The structure of the polyester polyol is not particularly limited. Examples thereof include those formed by condensation of a polyol and polycarboxylic acid. The polyol and polycarboxylic acid herein used are not particularly limited. Examples thereof include known ones.

Weight Average Molecular Weight of Polyester Polyol

The weight average molecular weight of the polyester polyol is preferably from 500 to 10000 and more preferably from 1000 to 5000 from the perspective of achieving excellent workability.

Amount of Trifunctional Polyol

The amount of the trifunctional polyol forming the urethane prepolymer is preferably from 5 to 40 parts by mass and more preferably from 15 to 35 parts by mass per 100 parts by mass of the urethane prepolymer from the perspective of achieving excellent workability (specifically, for example, low initial viscosity and/or thickening rate after aging).

In the present technology, the amounts of the components included in the polyol forming the urethane prepolymer (for example, polypropylene glycol, polyethylene glycol, trifunctional polyol, and polyester polyol) reflect the amounts of these components used for producing the urethane prepolymer. The same applies to the amount of the polyisocyanate forming the urethane prepolymer.

Polyisocyanate

The polyisocyanate forming the urethane prepolymer is not particularly limited as long as the polyisocyanate has two or more isocyanate groups in each molecule.

Examples of the polyisocyanate include tolylene diisocyanate (TDI; e.g., 2,4-tolylene diisocyanate and 2,6-tolylene diisocyanate), diphenylmethane diisocyanate (MDI; e.g., 4,4'-diphenylmethane diisocyanate, 2,4'-diphenylmethane diisocyanate), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), aromatic polyisocyanate such as triphenylmethane triisocyanate (polyisocyanate having an aromatic hydrocarbon group); aliphatic polyisocyanate (linear, branched, cyclic, or polyisocyanate having an aliphatic hydrocarbon group combining them) such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatemethyl)cyclohexane ($H_6$XDI), and dicyclohexylmethane diisocyanate ($H_{12}$MDI); carbodiimide-modified polyisocyanates thereof, isocyanurate-modified polyisocyanates thereof, and allophanate-modified polyisocyanates thereof.

The polyisocyanate is preferably an aromatic polyisocyanate and more preferably an MDI from the perspective of achieving excellent curability.

The equivalent ratio of the isocyanate group contained in the polyisocyanate to the hydroxy group contained in the polyol (isocyanate group/hydroxyl group) is preferably from 1.1 to 3.0 and more preferably from 1.2 to 2.0.

Thermoplastic (Meth)Acrylic Resin

The thermoplastic (meth)acrylic resin included in the adhesive of an embodiment of the present technology is not particularly limited as long as it is thermoplastic and a polymer formed by polymerizing a monomer which includes at least a monomer having a (meth)acryloyl group or a (meth)acryloyloxy group.

The adhesive of an embodiment of the present technology achieves high adhesion at an initial stage because it includes a thermoplastic (meth)acrylic resin.

In the present technology, thermoplasticity of the thermoplastic (meth)acrylic resin means that the resin is solid under room temperature conditions and is softened by heating.

Examples of the (meth)acrylic monomer which can form the thermoplastic (meth)acrylic resin include (meth)acrylate-based monomers, acidic functional group-containing (meth)acrylic monomers, tertiary amine-containing (meth) acrylic monomers, hydroxy group-containing (meth)acrylic monomers, and (meth) acrylamide-based monomers.

An ethylenically unsaturated bond-containing monomer which can be used other than the (meth)acrylic monomers is not particularly limited. Examples thereof include styrene and the like.

The thermoplastic (meth)acrylic resin may be a homopolymer or a copolymer.

A preferred embodiment of the thermoplastic (meth) acrylic resin is a thermoplastic polyacrylic resin.

Glass Transition Temperature of Thermoplastic Poly (Meth)Acrylic Resin

The glass transition temperature (Tg) of the thermoplastic poly (meth)acrylic resin is preferably from 30 to 100° C. and more preferably from 40 to 80° C. from the perspective of achieving excellent adhesion.

Weight Average Molecular Weight of Thermoplastic Poly (Meth)Acrylic Resin)

The weight average molecular weight of the thermoplastic poly (meth)acrylic resin is preferably from 20 thousand to 100 thousand and more preferably from 30 thousand to 80 thousand from the perspective of achieving excellent workability.

Content of Thermoplastic Poly (Meth)Acrylic Resin

The content of the thermoplastic poly (meth)acrylic resin is preferably from 5 to 30 parts by mass and more preferably from 15 to 30 parts by mass, per 100 parts by mass of the urethane prepolymer.

Reaction Catalyst

The adhesive according to an embodiment of the present technology may further include a reaction catalyst.

When the adhesive according to an embodiment of the present technology further includes a reaction catalyst, it has excellent initial curability.

The reaction catalyst is not particularly limited as long as it can promote reaction of isocyanate groups.

Examples of the reaction catalyst include compounds having a morpholine ring such as dimorpholinodiethyl ether (DMDEE).

The reaction catalyst is preferably a reaction catalyst having excellent thermal stability.

The amount of the reaction catalyst is not particularly limited. For example, the amount of the reaction catalyst may be from 0.1 to 5 parts by mass per 100 parts by mass of the urethane prepolymer.

Additives

The adhesive of the present technology may further include additives as necessary without impairing the purpose of the present technology.

Examples of the additives include fillers (e.g., carbon black and calcium carbonate), plasticizers, anti-aging agents, antioxidants, pigments, thixotropic agents, UV absorbents, flame retardants, surfactants, dispersants, dehydrating agents, and antistatic agents.

The amounts of the additives are not particularly limited. For example, the amounts of the additives may be the same as known amounts.

Method for Producing Adhesive of an Embodiment of the Present Technology

The method for producing the adhesive of an embodiment of the present technology is not particularly limited. For example, the adhesive of an embodiment of the present technology can be produced as follows. A polyol for forming a urethane prepolymer; and a thermoplastic (meth)acrylic resin are stirred at 120° C. under reduced pressure, the mixture of the polyol and the thermoplastic (meth)acrylic resin is dehydrated, and then a polyisocyanate for forming the urethane prepolymer is added to and reacted with the dehydrated mixture under conditions of 100 to 120° C. (specifically, for example, 120° C.), to produce the adhesive of an embodiment of the present technology including the urethane prepolymer formed from the polyol and the polyisocyanate; and the thermoplastic (meth)acrylic resin.

The adhesive of an embodiment of the present technology may further include a reaction catalyst or additives as necessary.

Examples of the base material to which the adhesive according to an embodiment of the present technology can be applied include plastics, glass, rubbers, metals, and the like.

Examples of the plastic include olefin resins, such as polypropylene and polyethylene; polyester resins such as polyethylene terephthalate (PET) and polybutylene terephthalate (PBT); polycarbonate resins; polymethyl methacrylate resins (PMMA resins), polystyrene resins, acrylonitrile-styrene copolymer resins, polyvinyl chloride resins, acetate resins, acrylonitrile-butadiene-styrene copolymer resins (ABS resins), and low adhesion resins such as polyamide resins.

The base material may have undergone a surface treatment. Examples of the surface treatment include flame treatment, corona treatment, and plasma treatment. The method of the surface treatment is not particularly limited. Examples thereof include known methods.

The adhesive of an embodiment of the present technology can be applied to a base material by heating and melting the adhesive.

The temperature for heating the adhesive of an embodiment of the present technology may be, for example, from 110 to 150° C.

The application method to the base material is not particularly limited. Examples thereof include known methods.

The adhesive of an embodiment of the present technology can be cured by reaction with water (e.g., moisture).

For example, the adhesive of an embodiment of the present technology can be cured under the conditions at 5 to 90° C. and a relative humidity of 5 to 95 (% RH).

The adhesive of an embodiment of the technology can be used as, for example, an adhesive for building materials; and an adhesive for automobile members such as bodies, doors, and lamps.

EXAMPLE

The present technology is described below in detail using examples but the present technology is not limited to such examples.

Production of Reactive Hot-Melt Adhesive

Preparation of Urethane Prepolymer

The components (excluding the polyisocyanate and reactive catalyst) shown in the column of the urethane prepolymer in Table 1 and the thermoplastic (meth)acrylic resin were charged into a reaction vessel in amounts (part by mass) shown in the same table and agitated at 120° C. under reduced pressure for 2 hours to dehydrate a mixture of the polyol and the thermoplastic (meth)acrylic resin.

Thereafter, the polyisocyanate shown in the column of the urethane prepolymer in Table 1 was added in an amount (part by mass) shown in the same table to the mixture after dehydration in a condition at 120° C., agitated under normal pressure for 1 hour and 30 minutes (a reactive catalyst was added as necessary at this time, followed by further agitation for 30 minutes), to produce a mixture (reactive hot-melt adhesive) of the urethane prepolymer and the thermoplastic (meth)acrylic resin. Note that the urethane prepolymer has an isocyanate group at a terminal thereof.

Evaluation

The following evaluations were performed using the reactive hot-melt adhesives produced as described below. The results are shown in Table 1. Initial Viscosity at 120° C.

The melt viscosity of each reactive hot-melt adhesive produced as described above was measured using a Brookfield Viscometer (DV2T viscometer, available from Brookfield AMETEK; No. 27 rotor; rotational speed: 2.5 rpm) in a condition at 120° C.

Specifically, each reactive hot-melt adhesive was heated in advance to 120° C., and 11 g of the adhesive was weighed in a cup of the viscometer. The cup of the viscometer was set in the viscometer and heated at 120° C. for 15 minutes, then a rotor was set, and further heating was performed for 15 minutes. Thereafter, the measurement was started, and the numerical value after 2 minutes was used as an initial viscosity.

Thickening Rate After Aging

After the initial viscosity was measured, each reactive hot-melt adhesive was left in the state for 90 minutes, then the viscosity was measured, and the measured value was used as a melt viscosity after aging. The value was then substituted into the formula below to calculate the thickening rate after aging.

Thickening rate after aging (%)=[(melt viscosity after aging−initial viscosity)/initial viscosity]×100

Initial Shear Strength

Preparation of Initial Samples

Each reactive hot-melt adhesive produced as described above was melted at 120° C. and applied on a plasma-treated polypropylene piece having a width of 2.5 cm, a length of 5 cm, and a thickness of 2 mm. The polypropylene piece coated with the reactive hot-melt adhesive was crimped with a polycarbonate piece having a width 2.5 cm and a length of 5 cm so that the adhesive area had a width of 2.5 cm, a length of 1 cm, and a thickness of the reactive hot-melt adhesive of 2 mm on the wrap surface, and the resulting product was used as a test piece.

The test piece was cured for 1 hour in a condition at 20° C. and 50% RH and used as an initial sample.

Measurement of Initial Shear Strength

Using each initial sample obtained as described above, the initial shear strength of the initial sample was measured at a tensile speed of 50 mm/min in a condition at 20° C.

The results are shown in the column of "Initial (after 20° C.×1 hr) at 20° C.".

Shear Strength After Curing

Preparation of Cured Sample

The initial samples obtained as described above were cured in a condition at 20° C. and 55% RH for 7 days to obtain cured samples.

Measurement of Shear Strength of Cured Sample

Using the cured samples obtained above, the shear strength of them was measured at a tensile speed of 50 mm/min in a condition at 20° C. or 120° C.

The results are shown in the columns of "After curing (20° C.×7 days), at 20° C." and "After curing (20° C.×7 days), at 120° C.".

Shear Strength After Heat Resistance Test

The heat resistance test was performed by leaving the cured samples obtained as described above in a condition at 120° C. for 7 days. The sample obtained after the test was used as a sample for heat resistance evaluation.

The shear strength of each sample for heat resistance evaluation was measured using the sample for heat resistance evaluation at a tensile speed of 50 mm/min under conditions at 20° C.

The results are shown in the column "After curing and heat resistance test, at 20° C.".

Shear Strength After Hot Water Resistance Test

The hot water resistance test was performed by immersing the cured samples obtained as described above in hot water at 40° C. for 7 days. After 7 days, the samples were taken out from the hot water and used as samples for hot water resistance evaluation.

The shear strength of each sample for heat resistance evaluation was measured using the sample for heat resistance evaluation at a tensile speed of 50 mm/min under conditions at 20° C.

The results are shown in the column "After curing and hot water resistance test, at 20° C.".

TABLE 1

|  |  | Example 1 | Example 2 | Example 3 | Example 4 |
|---|---|---|---|---|---|
| Urethane prepolymer | Bifunctional polyol (A-1-1) polypropylene glycol | 30 | 30 | 30 | 30 |
|  | Bifunctional polyol (A-1-2) polyethylene glycol | 17 | 17 | 17 | 17 |
|  | Bifunctional polyol (A-1-3) polytetramethylene glycol | 9 | 9 | 9 | 9 |
|  | Trifunctional polyol (A-2-1) polyoxypropylene triol | 22 | 22 | 15 | 45 |
|  | Polyester polyol (A-3-1) (Tg = 50° C.) | 22 | 22 | 22 | 22 |
|  | Polyester polyol (A-3-2) (Tg = 26° C.) |  |  |  |  |
|  | Comparative polyester polyol (Tg = −30° C.) |  |  |  |  |
|  | Polyisocyanate (A-4-1) | 16.1 | 16.1 | 15.3 | 19.0 |
| Thermoplastic (meth)acrylic resin | (B-1) Thermoplastic polyacrylic resin | 30 | 10 | 30 | 30 |
|  | (B-2) Thermoplastic polyacrylic resin |  |  |  |  |
| Reaction catalyst | DMDEE | 0.5 | 0.5 | 0.5 | 0.5 |
| Viscosity [cps] | Initial viscosity at 120° C. | 44000 | 32000 | 41000 | 48000 |
|  | Thickening rate after aging (thickening rate after 120° C. × 90 minutes) | 5.0% | 5.8% | 4.3% | 8.9% |
| Shear strength [MPa] | Initial (after 20° C. × 1 hr), at 20° C. | 1.0 | 0.8 | 0.8 | 1.5 |
|  | After curing (20° C. × 7 days), at 20° C. | 4.2 | 3.8 | 3.9 | 5.1 |
|  | After curing (20° C. × 7 days), at 120° C. | 1.6 | 1.4 | 1.1 | 2.2 |
|  | After curing and heat resistance test, at 20° C. (20° C. × 7 days → 120° C. × 7 days) | 3.9 | 3.3 | 3.6 | 4.5 |
|  | After curing and hot water resistance test, at 20° C. (20° C. × 7 days → hot water at 40° C. × 7 days) | 4.2 | 4.0 | 4.0 | 4.6 |

|  |  | Example 5 | Example 6 | Example 7 | Example 8 |
|---|---|---|---|---|---|
| Urethane prepolymer | Bifunctional polyol (A-1-1) polypropylene glycol | 30 | 30 | 30 | 30 |
|  | Bifunctional polyol (A-1-2) polyethylene glycol | 17 | 17 | 17 | 17 |

TABLE 1-continued

| | | | | | |
|---|---|---|---|---|---|
| | Bifunctional polyol (A-1-3) polytetramethylene glycol | 9 | 9 | 9 | 17 |
| | Trifunctional polyol (A-2-1) polyoxypropylene triol | 22 | 22 | 22 | 22 |
| | Polyester polyol (A-3-1) (Tg = 50° C.) | | 22 | 22 | 22 |
| | Polyester polyol (A-3-2) (Tg = 26° C.) | 22 | | | |
| | Comparative polyester polyol (Tg = −30° C.) | | | | |
| | Polyisocyanate (A-4-1) | 23.6 | 16.1 | 16.1 | 17.8 |
| Thermoplastic (meth)acrylic resin | (B-1) Thermoplastic polyacrylic resin | 30 | | 30 | 30 |
| | (B-2) Thermoplastic polyacrylic resin | | 30 | | |
| Reaction catalyst | DMDEE | 0.5 | 0.5 | 0.5 | 0.5 |
| Viscosity [cps] | Initial viscosity at 120° C. | 49000 | 40000 | 44000 | 42000 |
| | Thickening rate after aging (thickening rate after 120° C. × 90 minutes) | 6.2% | 5.1% | 4.8% | 4.2% |
| Shear strength [MPa] | Initial (after 20° C. × 1 hr), at 20° C. | 1.4 | 2.1 | 0.8 | 1.0 |
| | After curing (20° C. × 7 days), at 20° C. | 4.2 | 4.9 | 4.2 | 4.3 |
| | After curing (20° C. × 7 days), at 120° C. | 1.5 | 1.5 | 1.4 | 1.2 |
| | After curing and heat resistance test, at 20° C. (20° C. × 7 days → 120° C. × 7 days) | 3.7 | 4.5 | 4 | 4.6 |
| | After curing and hot water resistance test, at 20° C. (20° C. × 7 days → hot water at 40° C. × 7 days) | 3.7 | 4.7 | 3.8 | 4 |

| | | Example 9 | Example 10 | Comparative Example 1 |
|---|---|---|---|---|
| Urethane prepolymer | Bifunctional polyol (A-1-1) polypropylene glycol | 30 | 30 | 30 |
| | Bifunctional polyol (A-1-2) polyethylene glycol | 17 | 17 | 17 |
| | Bifunctional polyol (A-1-3) polytetramethylene glycol | 17 | | 9 |
| | Trifunctional polyol (A-2-1) polyoxypropylene triol | 22 | 22 | 22 |
| | Polyester polyol (A-3-1) (Tg = 50° C.) | 30 | 22 | |
| | Polyester polyol (A-3-2) (Tg = 26° C.) | | | |
| | Comparative polyester polyol (Tg = −30° C.) | | | |
| | Polyisocyanate (A-4-1) | 19.5 | 14.2 | 11.6 |
| Thermoplastic (meth)acrylic resin | (B-1) Thermoplastic polyacrylic resin | 30 | 30 | 30 |
| | (B-2) Thermoplastic polyacrylic resin | | | |
| Reaction catalyst | DMDEE | 0.5 | 0.5 | 0.5 |
| Viscosity [cps] | Initial viscosity at 120° C. | 48000 | 49000 | 33000 |
| | Thickening rate after aging (thickening rate after 120° C. × 90 minutes) | 4.5% | 18.2% | 3.8% |
| Shear strength [MPa] | Initial (after 20° C. × 1 hr), at 20° C. | 0.8 | 1.1 | 0.7 |
| | After curing (20° C. × 7 days), at 20° C. | 4.5 | 4.3 | 3.1 |
| | After curing (20° C. × 7 days), at 120° C. | 1.8 | 1.5 | 0.2 |
| | After curing and heat resistance test, at 20° C. (20° C. × 7 days → 120° C. × 7 days) | 4.5 | 3.2 | 1.1 |
| | After curing and hot water resistance test, at 20° C. (20° C. × 7 days → hot water at 40° C. × 7 days) | 4.1 | 4.1 | 2.4 |

TABLE 1-continued

|  |  | Comparative Example 2 | Comparative Example 3 | Comparative Example 4 |
|---|---|---|---|---|
| Urethane prepolymer | Bifunctional polyol (A-1-1) polypropylene glycol | 30 | 30 | 30 |
|  | Bifunctional polyol (A-1-2) polyethylene glycol | 17 | 17 | 17 |
|  | Bifunctional polyol (A-1-3) polytetramethylene glycol | 9 | 9 | 9 |
|  | Trifunctional polyol (A-2-1) polyoxypropylene triol | 22 |  | 22 |
|  | Polyester polyol (A-3-1) (Tg = 50° C.) |  | 22 | 22 |
|  | Polyester polyol (A-3-2) (Tg = 26° C.) |  |  |  |
|  | Comparative polyester polyol (Tg = −30° C.) | 22 |  |  |
|  | Polyisocyanate (A-4-1) | 14.1 | 13.4 | 16.1 |
| Thermoplastic (meth)acrylic resin | (B-1) Thermoplastic polyacrylic resin | 30 | 30 |  |
|  | (B-2) Thermoplastic polyacrylic resin |  |  |  |
| Reaction catalyst | DMDEE | 0.5 | 0.5 | 0.5 |
| Viscosity [cps] | Initial viscosity at 120° C. | 39000 | 34000 | 22000 |
|  | Thickening rate after aging (thickening rate after 120° C. × 90 minutes) | 6.8% | 2.5% | 3.9% |
| Shear strength [MPa] | Initial (after 20° C. × 1 hr), at 20° C. | 1.3 | 0.4 | 0.1 |
|  | After curing (20° C. × 7 days), at 20° C. | 3.8 | 3.2 | 2.7 |
|  | After curing (20° C. × 7 days), at 120° C. | 0.4 | 0.3 | 0.4 |
|  | After curing and heat resistance test, at 20° C. (20° C. × 7 days → 120° C. × 7 days) | 2.1 | 0.9 | 1.6 |
|  | After curing and hot water resistance test, at 20° C. (20° C. × 7 days → hot water at 40° C. × 7 days) | 3.1 | 2.5 | 1.6 |

Details of the components described in Table 1 (e.g., compound name, product name, and manufacturer) are as follows.

TABLE 2

(A-1-1) polypropylene glycol (PLEMINOL 510, available from Asahi Glass Co., Ltd.; f = 2, Mw 4000)
(A-1-2) polyethylene glycol (PEG #2000U, available from NOF Corporation; f = 2, Mw 2000)
(A-1-3) polytetramethylene glycol (PTMG 2000, available from Mitsubishi Chemical Corporation; f = 2, Mw 2000)
(A-2-1) polyoxypropylene triol (EXCENOL 5030, available from Asahi Glass Co., Ltd.; f = 3, Mw 5000)
(A-3-1) polyester polyol (HS2F-237P, available from Hokoku Co., Ltd., f = 2, Tg = 50° C., Mw 2000, amorphous)
(A-3-2) polyester polyol (HS2F-136P, available from Hokoku Co., Ltd., f = 2, Tg = 26° C., Mw 1000, amorphous)
Comparative polyester polyol (HS2H-359T, available from Hokoku Co., Ltd., f = 2, Tg = −30° C., crystalline)
(A-4-1) polyisocyanate (MDI, MILLIONATE MT, available from Nippon Polyurethane Industry Co., Ltd.)
(B-1) thermoplastic polyacrylic resin (DIANAL BR 106, available from Mitsubishi Rayon Co., Ltd., Tg: 50° C., Mw 60000)
(B-2) thermoplastic polyacrylic resin (DIANAL BR 113, available from Mitsubishi Rayon Co., Ltd., Tg: 75° C., Mw 30000)
DMDEE (U-CAT660M, available from San-Apro Ltd.) dimorpholinodiethyl ether In Table 2, "f" means the number of hydroxy groups in each molecule of the compounds. Mw means the weight average molecular weight, and Tg means the glass transition temperature.

As is evident from the results shown in Table 1, Comparative Example 1, which included a urethane prepolymer that did not use a prescribed polyester polyol as a polyol, had low thermal adhesive strength (shear strength after curing measured under conditions at 120° C.), low shear strength after the durability test (heat resistance test or hot water resistance test after curing), and inferior durability.

Comparative Example 2, which included a urethane prepolymer that used a polyester polyol with a glass transition temperature outside a predetermined range as a polyol instead of the prescribed polyester polyol, had low thermal adhesive strength and inferior durability.

Comparative Example 3, which included a urethane prepolymer that did not use a trifunctional polyol as a polyol, had low thermal adhesive strength and inferior durability.

Comparative Example 4, which included no thermoplastic (meth)acrylic resin, had low thermal adhesive strength and inferior durability.

In contrast, the adhesive of an embodiment of the present technology had high thermal adhesive strength and excellent durability.

In Example 1 to 9 in which the bifunctional polyol forming the urethane prepolymer further included polytetramethylene glycol, the thickening rate after aging was lower and workability was better than those of Example 10 which did not include polytetramethylene glycol.

Furthermore, Example 1 including the reaction catalyst had higher initial shear strength than Example 7 including no reaction catalyst.

The invention claimed is:

1. A reactive hot-melt adhesive comprising a urethane prepolymer formed from a polyol and a polyisocyanate; and a thermoplastic poly (meth)acrylic resin,
   the polyol comprising a bifunctional polyol comprising polypropylene glycol and polyethylene glycol,
   a trifunctional polyol, and
   a polyester polyol having a glass transition temperature of from 20 to 60° C.

2. The reactive hot-melt adhesive according to claim 1, wherein the bifunctional polyol further comprises polytetramethylene glycol.

3. The reactive hot-melt adhesive according to claim 1, wherein
   the glass transition temperature of the thermoplastic poly (meth)acrylic resin is from 40 to 80° C., and
   the weight average molecular weight of the thermoplastic poly(meth)acrylic resin is from 20 thousand to 100 thousand.

4. The reactive hot-melt adhesive according to claim 1, further comprising a reaction catalyst.

5. The reactive hot-melt adhesive according to claim 1, wherein the amount of the trifunctional polyol forming the urethane prepolymer is from 5 to 40 parts by mass per 100 parts by mass of the urethane prepolymer.

6. The reactive hot-melt adhesive according to claim 1, wherein the content of the thermoplastic poly (meth)acrylic resin is from 5 to 30 parts by mass per 100 parts by mass of the urethane prepolymer.

7. The reactive hot-melt adhesive according to claim 2, wherein
   the glass transition temperature of the thermoplastic poly (meth)acrylic resin is from 40 to 80° C., and
   the weight average molecular weight of the thermoplastic poly(meth)acrylic resin is from 20 thousand to 100 thousand.

8. The reactive hot-melt adhesive according to claim 2, further comprising a reaction catalyst.

9. The reactive hot-melt adhesive according to claim 2, wherein the amount of the trifunctional polyol forming the urethane prepolymer is from 5 to 40 parts by mass per 100 parts by mass of the urethane prepolymer.

10. The reactive hot-melt adhesive according to claim 2, wherein the content of the thermoplastic poly (meth)acrylic resin is from 5 to 30 parts by mass per 100 parts by mass of the urethane prepolymer.

11. The reactive hot-melt adhesive according to claim 3, further comprising a reaction catalyst.

12. The reactive hot-melt adhesive according to claim 3, wherein the amount of the trifunctional polyol forming the urethane prepolymer is from 5 to 40 parts by mass per 100 parts by mass of the urethane prepolymer.

13. The reactive hot-melt adhesive according to claim 3, wherein the content of the thermoplastic poly (meth)acrylic resin is from 5 to 30 parts by mass per 100 parts by mass of the urethane prepolymer.

14. The reactive hot-melt adhesive according to claim 4, wherein the amount of the trifunctional polyol forming the urethane prepolymer is from 5 to 40 parts by mass per 100 parts by mass of the urethane prepolymer.

15. The reactive hot-melt adhesive according to claim 4, wherein the content of the thermoplastic poly (meth)acrylic resin is from 5 to 30 parts by mass per 100 parts by mass of the urethane prepolymer.

16. The reactive hot-melt adhesive according to claim 5, wherein the content of the thermoplastic poly (meth)acrylic resin is from 5 to 30 parts by mass per 100 parts by mass of the urethane prepolymer.

* * * * *